Aug. 18, 1925.                         1,550,250
W. J. HACKETT
CONVEYER MECHANISM
Filed Aug. 21, 1920        4 Sheets-Sheet 1
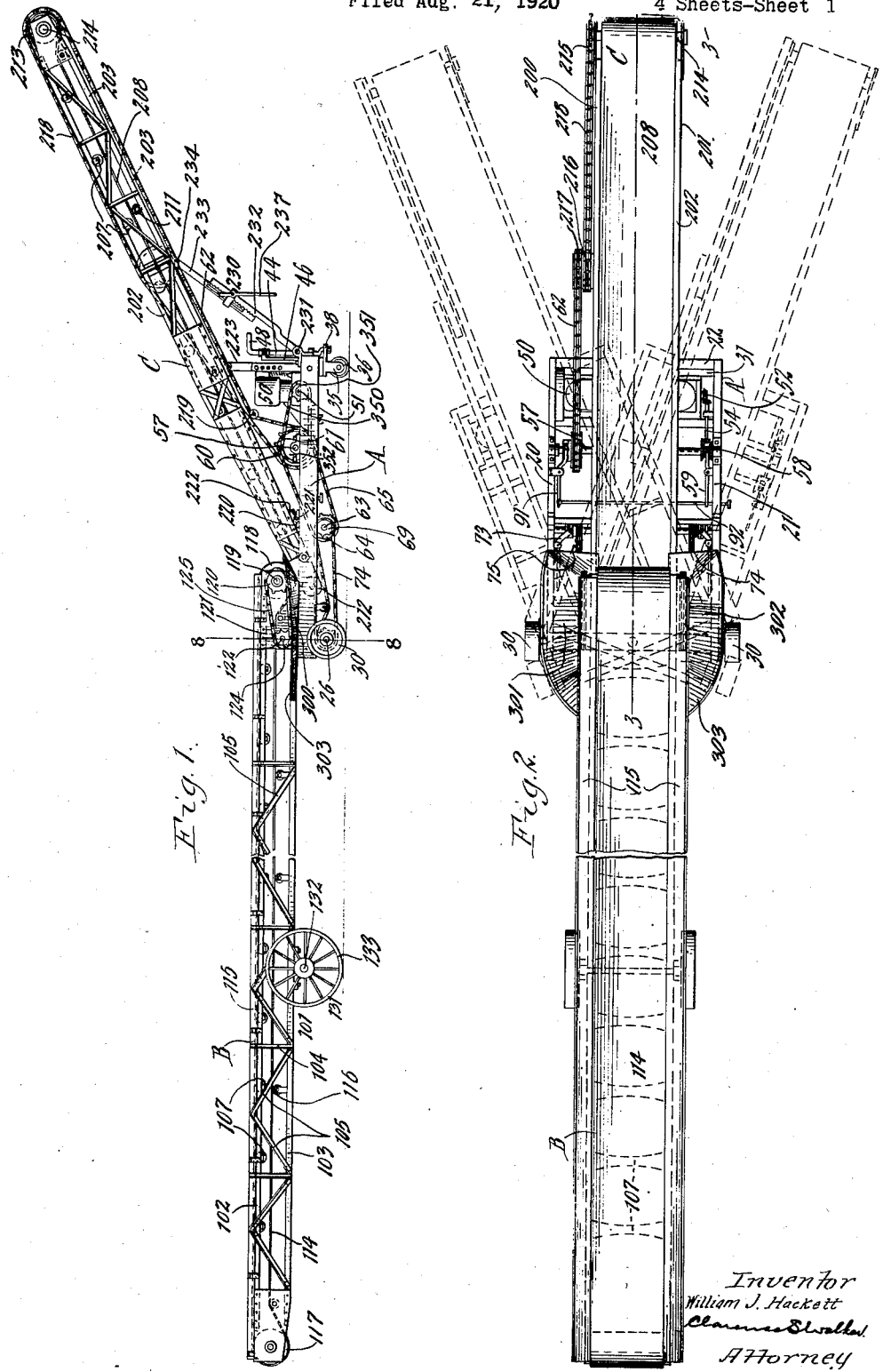

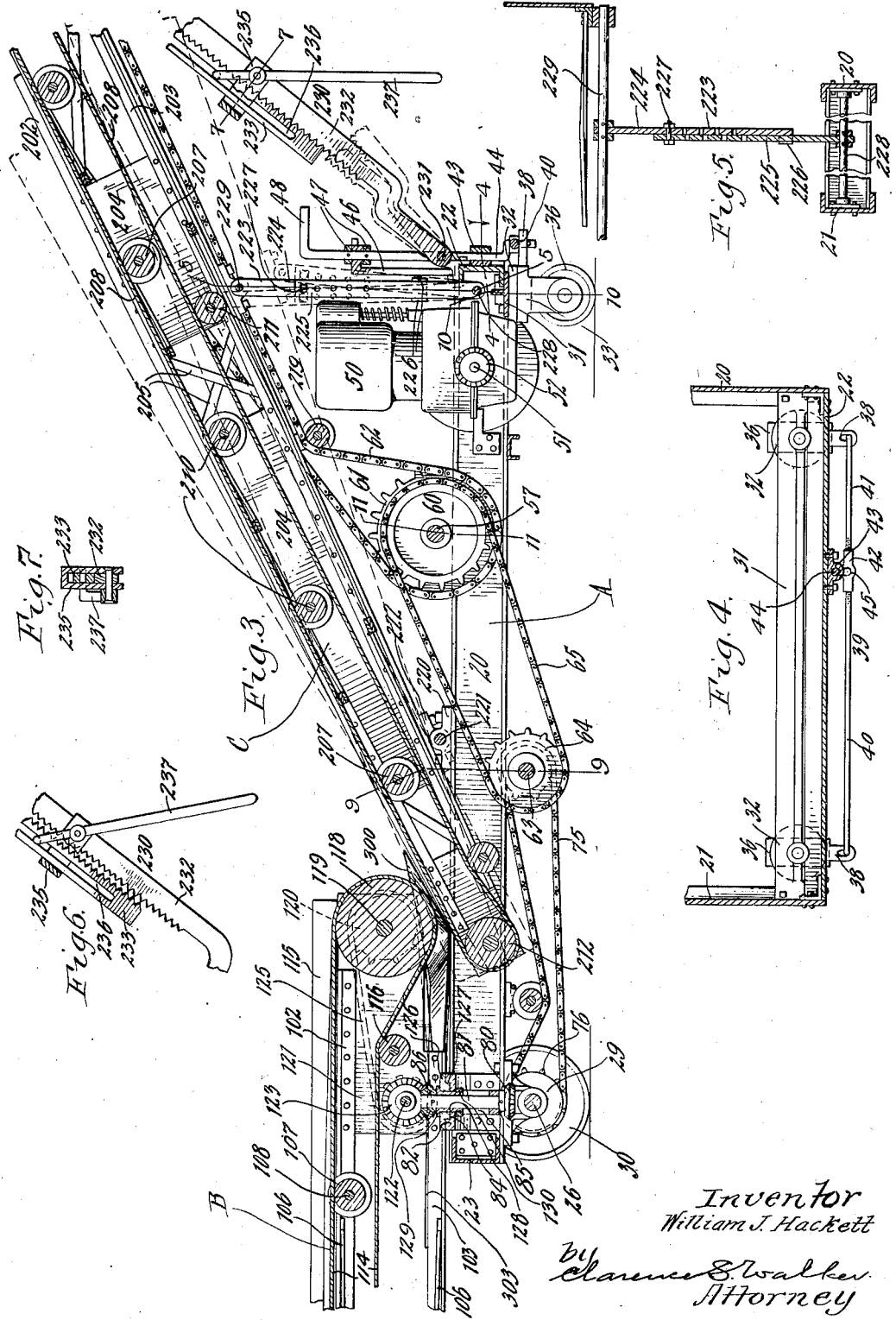

Aug. 18, 1925.
W. J. HACKETT
CONVEYER MECHANISM
Filed Aug. 21, 1920  4 Sheets-Sheet 3
1,550,250
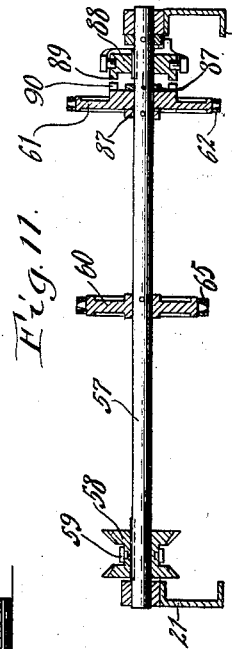
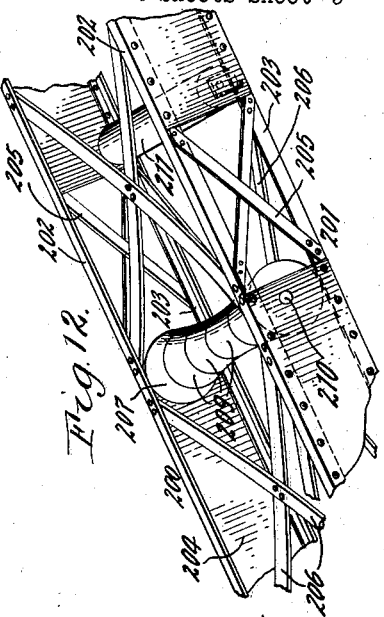
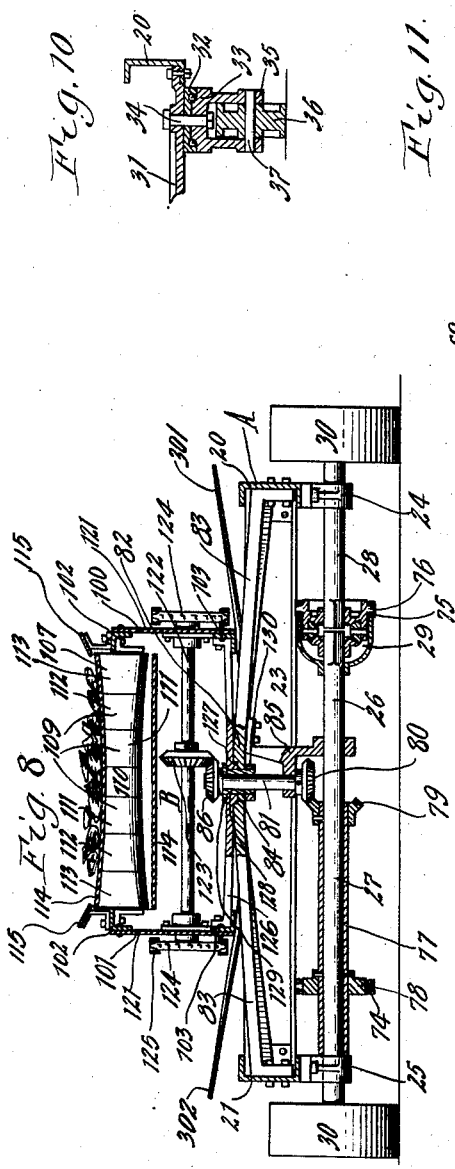
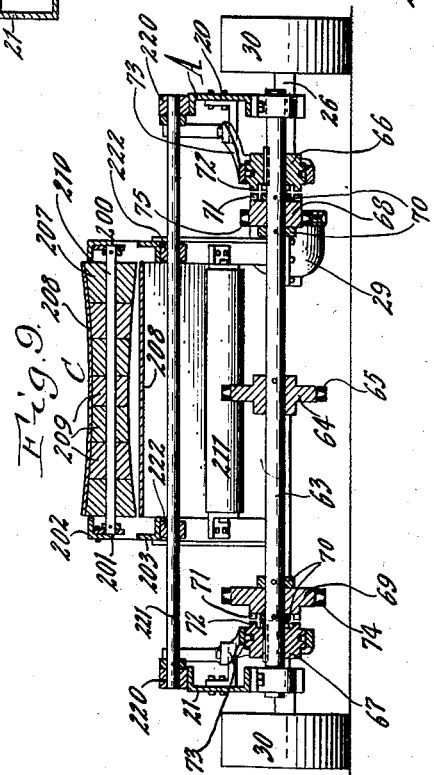
Inventor
William J. Hackett
by Clarence S. Walker
Attorney

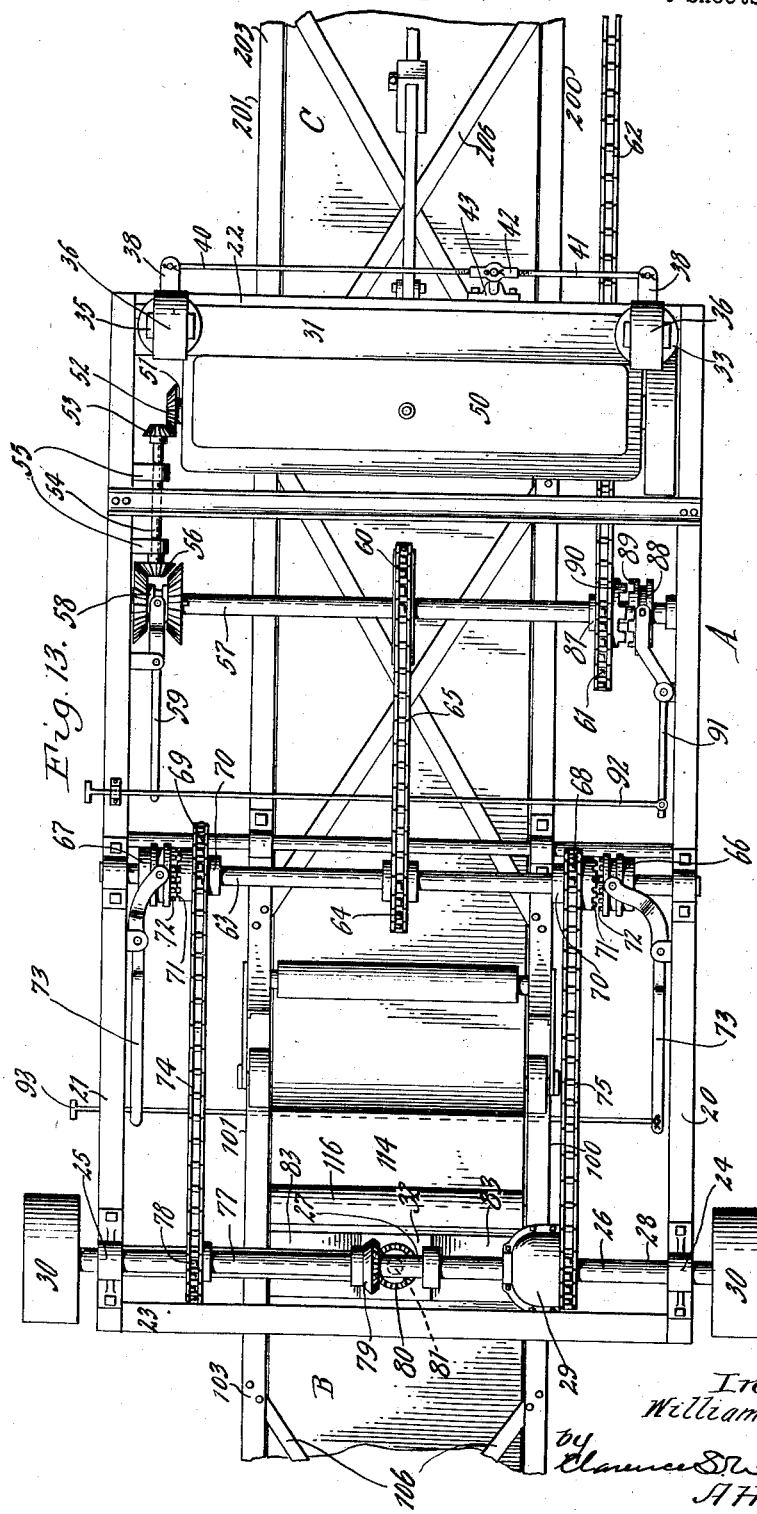

Patented Aug. 18, 1925.

1,550,250

UNITED STATES PATENT OFFICE.

WILLIAM J. HACKETT, OF BUFFALO, NEW YORK.

CONVEYER MECHANISM.

Application filed August 21, 1920. Serial No. 404,978.

*To all whom it may concern:*

Be it known that I, WILLIAM J. HACKETT, a citizen of the United States, and resident of Buffalo, county of Erie, State of New York, have invented certain new and useful Improvements in Conveyer Mechanism, of which the following is a specification.

This invention relates to an improvement in conveyer mechanism and particularly to the combination of two conveyers movably mounted on a truck.

In road building and other operations it is necessary to use conveyer mechanism which can be transported from place to place but in such mechanism the conveyer or conveyers are fixed onto the truck. Such a mechanism is difficult to move by reason of its length and is particularly objectionable when working in a small space or at the corner of a road.

By pivotally mounting the feed conveyer on the truck the difficulty of and the objection to the old style of mechanism are overcome; in fact, this mechanism may be operated when the truck and feed conveyer are at right angles if required by the location of the work as for instance around a corner.

Another advantage of this construction is that the range of the discharge conveyer is greatly increased without changing the position of the feed conveyer. Hence the material can be dumped in a large quantity at one spot instead of being distributed along the road.

One object of this invention is to provide conveyer mechanism consisting of two conveyers so mounted that they can be positioned at any angle to one another even as far as a right angle without interfering in any way with the operating connections.

A further object is to provide a truck which carries two belt conveyers and a prime mover adapted to drive the truck, to operate either conveyer or to do all three at once.

A still further object is to provide in a belt conveyer, belt supporting pulleys consisting of a plurality of independent rollers of truncated conical form.

Other objects will appear from an examination of the specification and the drawings annexed thereto and forming a part thereof, in which:

Fig. 1 is a side elevation of one embodiment of this invention;

Fig. 2 is a plan view;

Fig. 3 is an enlarged longitudinal section taken on the line 3—3, in Fig. 2;

Fig. 4 is a sectional view on the line 4—4 in Fig. 3 showing part of the steering mechanism;

Fig. 5 is a section on the line 5—5 in Fig. 3 showing one of the supporting elements for the discharge conveyer;

Fig. 6 is a detail view of another of the supporting elements;

Fig. 7 is a section on the line 7—7 in Fig. 3;

Fig. 8 is a section on the line 8—8 in Fig. 1 showing the driving means for the feed conveyer;

Fig. 9 is a section on the line 9—9 in Fig. 3 showing part of the driving mechanism and the discharge conveyer;

Fig. 10 is a section on the line 10—10 in Fig. 3 showing one of the steering wheels;

Fig. 11 is a section on the line 11—11 in Fig. 3 showing the main power shaft;

Fig. 12 is a plan view of one of the conveyer structures with the conveyer belt removed; and Fig. 13 is a view from beneath the truck showing the interrelation of the driving mechanisms.

Referring to the drawings the reference letter A designates the main truck on which are pivoted the feed conveyer B and the discharge conveyer C. The truck A consists of a framework made up of side frame plates 20 and 21 and front and rear frame plates 22 and 23. Bolted to the side frame plates 20 and 21 are bolsters 24 and 25 in which the rear axle 26 is mounted in the usual manner to freely rotate. The axle 26 is made up of sections 27 and 28 driven through the differential 29 and extending beyond the plates 20 and 21. Splined or otherwise securely fastened to the ends of the axle sections are the wheels 30.

Bolted to the plates 20 and 21 behind the front plate 22 is a plate 31 on which the front wheels of the truck are mounted. Flanged disks 32 are welded to the underside of the plate 31 adjacent each end and in each disk is rotatably positioned a forked piece 33. As shown the piece 33 is held in place by a bolt 34 and roller bearings are provided between the piece and the disk to insure easy turning while the wheel 36 and the axle 37 are carried by the arm 35 of the forked piece 33.

Projecting from the front of both pieces 33 are arms 38 to which are connected the steering link 39, made up of two rods 40 and 41 joined by a union coupling 42 so that the length of the link can be readily adjusted. Through a bolster 43 fastened to the front plate 22 extends a vertical steering bar 44 having a double right angled bend adjacent its lower end, so as to enter a hole 45 in the coupling 42. The steering bar is further supported in position by an arm 46 rising from the plate 22 and having a hole therein through which the bar is passed, rings 47 being fastened to the bar above and below the arm 46 to hold the bar in place while at the upper end of the bar is a handle 48.

Supported between the side plates 20 and 21 near the front plate 22 is an engine 50 which through connections to be described later in detail drives the truck and operates the conveyers. While a gasoline motor is shown in the drawings it is obvious that any desired form of prime mover can be used instead. At the end of the drive shaft 51 is a bevel gear 52 with which meshes a bevel gear 53 on a shaft 54 supported by arms 55 from the side plate 21 and having at its other end a bevel gear 56.

Rotatably mounted in the side plates is an intermediate shaft 57 on which is slidably mounted a two gear clutch 58 between the gears of which the gear 56 is positioned. By means of the handle 59 the clutch is shifted to bring either one of the gears into mesh with the gear 56, thus controlling the direction of rotation of the shaft 57.

Mounted on the shaft 57 are sprockets 60 and 61. The sprocket 60 is fixed intermediate the ends of the shaft and drives a second transverse shaft 63 supported like the shaft 57 by the plates 20 and 21. The sprocket 61 rotates freely on the shaft being fixed in position by rings 87. Adjacent the sprocket and splined to the shaft is a clutch collar 88 having teeth 89 to engage the teeth 90 on the sprocket. When the collar is shifted on the shaft by the handle 91 into engagement with the sprocket the latter through the chain 62 drives the discharge conveyer. A bar 92 extends across the main truck A so that both clutches 58 and 88 are operated from the same side, preferably the right as shown.

The shaft 63 carries a sprocket 64 in line with the sprocket 60 and driven thereby through the chain 65. Clutch collars 66 and 67 are splined on the shaft 63 to rotate therewith, adjacent the sprockets 68 and 69. The sprockets 68 and 69 rotate freely on the shaft being fixed in relative position by the rings 70 pinned to the shaft. Suitable teeth 71 and 72 are provided on the sprockets 68 and 69 and the clutch collars 66 and 67 so that when either collar is shifted on the shaft 63 by the handles 73 the teeth will engage and the sprocket rotate with the shaft. Attached to the handle operating the collar 66 is a bar 93 which like the bar 92 extends across the truck whereby both handles are operated from the right side of the truck. By using the bars 92 and 93 all the clutches can be controlled from the right side of the truck by a single operator.

The sprocket 69 operates the feed conveyer B by means of the chain 74, while the sprocket 68 drives the truck A by means of the chain 75 and the differential sprocket 76 of the rear axle 26. On the axle section 27 is mounted a sleeve 77 to which is pinned a sprocket 78 in line with the sprocket 69 and driven by the chain 74. At its inner end the sleeve 77 has a gear 79 which meshes with a gear 80 on a vertical shaft 81 located equidistant from the side plates 20 and 21 by a platform 82. The platform has legs 83 bolted to the plates 20 and 21 and a circular depression 84 at the center through which the vertical shaft 81 extends. An auxiliary support for the shaft 81 and the axle section 26 is provided in the arm 85 which depends from and is bolted to the platform as shown in Fig. 8. On the upper end of the shaft 81 is a gear 86 through which power is transmitted to the feed conveyer B.

Referring particularly to Fig. 13 it will be observed that when the machine is driven along the road the clutch 66 is in engagement with the sprocket 68 while the clutches 67 and 88 are idle. Upon arrival at the desired place the clutch 66 is thrown out and the clutches 67 and 88 are thrown in so that the feed and discharge conveyers will operate while the truck is at rest. It is sometimes necessary to have the machine in motion while supplying the material and in such a case the clutch 66 is also thrown in. Moreover either conveyer may be operated independent of the other by throwing in the proper clutch and leaving the other idle.

By shifting the clutch 58 the truck may be driven either forward or backward and this is of course equally true of the operation of the conveyers.

The feed conveyer B comprises side frames 100 and 101. Each frame is made up of upper bars 102 and lower bars 103 joined and spaced by vertical bars 104 and straps 105, the frames themselves being connected by bracing straps 106. A series of rollers 107 are mounted on rods 108 fastened to the upper bars 102 in any suitable way. Each roller is made up of a plurality of segments 109 freely and independently rotatable. As shown in Fig. 8 there are seven of these segments, the middle one 110 being cylindrical while the others have the contour of truncated cones of different sizes the smallest being at the outside. The segments are made interchangeable in pairs, the separate pairs being designated as 111, 112 and 113.

The conveyer belt 114 is supported by these rollers during its forward movement and, by reason of the form of the rollers described above, is slightly trough shaped under the weight of the load it is carrying. The bracing straps 106 are also somewhat curved so as not to disturb the contour of the belt. At the sides of the conveyer belt are inclined guide plates 115 carried by the upper frame bars 102, the inner edges of the plates overhanging the belt 114 to carry out the trough idea. Rollers 116 are provided to support the belt in its return journey, such rollers being mounted on the lower side bars 103. At the outer end is a large idle roller 117, while at the inner end is a roller 118 on an axle 119 and having at each end outside the side frames a sprocket 120. Near the roller 118 are plates 121 fastened to the side frame bars through which a shaft 122 extends above the truck axle 26 and when the truck and feed conveyer are in alignment parallel thereto. On the shaft 122 is a gear 123 which meshes with the gear 86 on the vertical shaft 81 which is as previously described driven by the prime mover 50. At the ends of the shaft 122 outside the frames and in line with the sprockets 120 are sprockets 124 from which the sprockets 120 are driven by chains 125.

Below the shaft 122 is a cross plate 126 fastened to the side frames 100 and 101 and having at its center a cylindrical boss 127 which seats in the circular depression 84 of the platform 82. The boss and depression act as a pivot point to allow the feed conveyer and the truck to be at an angle to each other. A sleeve 128 around the shaft 81 fastens the plate 126 to the platform 82 without interfering with its pivotal movement. As shown the sleeve 128 has a flange 129 bearing on the cross plate 126 and is fixed in position by a nut 130 below the platform 82.

In order to support the outer end of the feed conveyer an auxiliary truck 131 is secured to the lower side bars 103, said truck comprising an axle 132 and wheels 133.

The discharge conveyer like the feed conveyer consists of a framework comprising side frames 200 and 201 each frame having upper and lower side bars 202 and 203 joined by plates 204 and straps 205 while the side frames are connected by straps 206 shown in Fig. 12. The rollers 207 supporting the upper stretch of the belt 208 are made up like the rollers 107 of a plurality of segments 209 each freely and independently rotatably mounted on rods 210. A comparison of Figs. 8 and 9 will disclose the identity in construction of the rollers so that a detailed description is believed to be unnecessary. Rollers 211 for supporting the slack stretch of the belt are mounted on the lower side bars 203. At the inner end of the conveyer is a large idle roller 212 and at the outer end is a large driven roller 213 having at one end of its shaft 214 a sprocket 215.

Intermediate the length of the conveyer is a shaft extending from the side frame 200 and provided with two sprockets 216 and 217. The sprocket 216 is in line with the sprocket 215 and is connected therewith by a chain 218 while the sprocket 217 is in line with the sprocket 61 and driven by the chain 62. The conveyer belt is thus driven from the prime mover 50. A supplementary roller 219 is provided to support the slack part of the chain 62.

The manner of pivoting the discharge conveyer on the truck A will now be described. On the top of the side plates 20 and 21 of the truck A are blocks 220 in which is supported a rod 221, while on the underside of the side plates 200 and 201 of the conveyer C are similar blocks 222 through which the rod 221 passes. The rod 221 thus acts to pivot the discharge conveyer and permit its oscillation in a vertical plane. The conveyer is also supported by an upright 223 comprising two bars 224 and 225. The bar 224 is provided at its lower end with flanges 226 extending at each side of the bar 225 and both bars have a plurality of holes through which a bolt 227 may be passed to adjust the upright to the desired height. The lower end of the bar 225 is oscillatably mounted on a rod 228 fixed between the side plates 20 and 21 and the upper end of the bar 224 is similarly mounted on a rod 229 held to the lower edges of the side bars 204, ring plates being pinned to the rods 228 and 229 on either side of the bars 224 and 225.

In addition to the upright 223 a supplementary support 230 is provided. This support comprises two bars 232 and 233 adjustably joined together, the lower end of the bar 232 being pivoted at 231 to the front of the truck and the upper end of the bar 233 being pivoted at 234 to the lower part of the discharge conveyer. The bars contact edge to edge, the contacting edges of both bars being transversely serrated to prevent slipping of one bar on the other when in contact. In order to hold the bars in proper relative position a strap 235 is passed around the bar 233 and fastened at each end to the bar 232. The bar 233 has a longitudinal slot 236 in which the end of a handle 237, pivoted on the bar 232, rests. When it is desired to move the bar 233 out of contact with the bar 232 the handle is swung on its pivot from the position of Fig. 3 to that of Fig. 6. In the latter position the bar 233 is held against the strap 235 by the handle 237. The strap under such conditions therefore acts as a friction brake so that the discharge conveyer can be eased down slowly to the desired position after the bolt 227 has been withdrawn. When that position is reached the conveyer is held either by the engagement of the bars 232 and 233 or the bar 233 and the strap 235. The serrated edges of the bars 232 and 233 are normally in contact and by reason of their contour hold the outer end of the conveyer C steady.

Mounted on the main truck A below the inner end of the feed conveyer B and above the inner end of the discharge conveyer C is a guide or hopper 300. This hopper has side plates 301 and 302 which as shown in Fig. 2 overhang the conveyer belt 208, and a rear plate 303 which prevents the material from falling off the end of the belt 208. The plate 303 also acts as a side plate when the truck A is at an angle to the conveyer B as shown by the dotted lines in Fig. 2. While the drawings show the truck at only a small angle to the conveyer it will be obvious that the construction described above permits it to be at right angles if desired.

Since the shaft 81 passes through the pivotal connection of the feed conveyer B and the truck A the operation of the conveyer is independent of the relative position of the conveyer and the truck. The same is true of the operating drive for the discharge conveyer C since the arrangement of the power transmitting chains permits the vertical adjustment of the conveyer.

In place of the gear drive 52, 53, 54, 56, and 58 described above the chain drive shown in Fig. 1 may be employed, the chain 350 running from the sprocket 351 on the shaft 51 to the sprocket 352 on the shaft 57 and any suitable direction controlling clutch being used.

It will be noted that in the normal operation of the machine both conveyer belts are pulled with the load to the discharging end, the return portions of the belt not being directly under tension.

While one embodiment only of my invention has been shown and described it is obvious that others may be made without departing from the spirit and scope of the invention as set forth in the following claims.

Having thus set forth my invention what I claim and desire to have protected by Letters Patent is:

1. A conveyer mechanism comprising a feed conveyer, a truck on which said feed conveyer is rigidly mounted, a cross plate adjacent one end of said conveyer, a cylindrical boss at the center of said plate, a second truck, a platform on said second truck having a depression therein, which said boss enters whereby one end of said conveyer is supported upon said truck and said truck is permitted to move horizontally with reference to said conveyer, a belt on said conveyer, gearing extending through said boss and depression for actuating said belt, a discharge conveyer pivotally mounted upon said second truck for movement in a vertical plane relative thereto, means on said truck for raising and lowering said discharge conveyer, a belt on said conveyer, gearing for actuating said belt, a shaft on said second truck for driving both of said gearings and means carried by said second named truck for rotating said shaft.

2. A conveyer mechanism comprising a feed conveyer, a truck on which said feed conveyer is rigidly mounted, a cross plate adjacent one end of said conveyer, a cylindrical boss at the center of said plate, a second truck, a platform on said second truck having a depression therein, which said boss enters whereby one end of said conveyer is supported upon said truck and said truck is permitted to move horizontally with reference to said conveyer, a belt on said conveyer, gearing extending through said boss and depression for actuating said belt, a discharge conveyer pivotally mounted upon said second truck for movement in a vertical plane relative thereto, means on said truck for raising and lowering said discharge conveyer, a belt on said conveyer, gearing for actuating said belt, a shaft on said second truck, driving wheels on said shaft, a sleeve on said shaft for driving said feed conveyer belt gearing, a second shaft gearing connecting said second shaft to said first shaft, said second shaft to said sleeve and to said gearing actuating said discharge conveyer belt and an engine on said second named truck for rotating said second shaft.

In testimony whereof, I affix my signature.

WILLIAM J. HACKETT.